United States Patent
Mizutani

(10) Patent No.: US 8,550,589 B2
(45) Date of Patent: Oct. 8, 2013

(54) IMAGE RECORDING METHOD AND IMAGE RECORDING DEVICE

(75) Inventor: Toshiyuki Mizutani, Tokyo (JP)

(73) Assignee: Konica Minolta Holdings, Inc., Chiyoda-Ku, Tokyo (JP)

(*) Notice: Subject to any disclaimer, the term of this patent is extended or adjusted under 35 U.S.C. 154(b) by 433 days.

(21) Appl. No.: 12/995,814

(22) PCT Filed: May 29, 2009

(86) PCT No.: PCT/JP2009/059860
§ 371 (c)(1),
(2), (4) Date: Dec. 2, 2010

(87) PCT Pub. No.: WO2009/150945
PCT Pub. Date: Dec. 17, 2009

(65) Prior Publication Data
US 2011/0109680 A1 May 12, 2011

(30) Foreign Application Priority Data
Jun. 9, 2008 (JP) ................................ 2008-150888

(51) Int. Cl.
*B41J 2/205* (2006.01)
(52) U.S. Cl.
USPC .......................................................... 347/15
(58) Field of Classification Search
USPC .......................................................... 347/15
See application file for complete search history.

(56) References Cited

U.S. PATENT DOCUMENTS

| 5,450,099 A | 9/1995 | Stephenson | |
|---|---|---|---|
| 2006/0132538 A1 | 6/2006 | Lee | |
| 2007/0153038 A1* | 7/2007 | Silverbrook et al. | 347/9 |
| 2007/0242098 A1 | 10/2007 | Sudo | |

FOREIGN PATENT DOCUMENTS

| JP | 04-038589 | 2/1992 |
|---|---|---|
| JP | 2003-534171 | 11/2003 |
| JP | 2004-122546 | 4/2004 |
| JP | 3702711 | 7/2005 |
| JP | 2006-305910 | 11/2006 |
| JP | 2007-88927 | 4/2007 |

OTHER PUBLICATIONS

Supplemental European Search Report EP 09 76 2375 (date of completion Jul. 12, 2013) 6 pages).

* cited by examiner

*Primary Examiner* — Uyen Chau N Le
*Assistant Examiner* — Hoang Tran
(74) *Attorney, Agent, or Firm* — Lucas & Mercanti, LLP

(57) ABSTRACT

An image recording device comprising a line head including a plurality of recording element arrays arranged in one direction such that the recording elements have overlapping regions at the mutually adjoining end portions, characterized by comprising a halftone processor for subjecting multilevel image data to a halftone process in accordance with a first half tone processing rule to form the pattern of the dots to be recorded, as a recording pattern, an allocation processor for allocating which of the recording element arrays adjoining in the overlapping regions is used to record according to the recording pattern, by using a second half tone processing rule to suppress the low-frequency component of a space frequency, and a driver for driving the recording elements so that the dot data allocated to the individual recording element arrays may be recorded by the recording elements of the individual recording element arrays contained in the line head.

10 Claims, 10 Drawing Sheets

(a1) HEAD A+HEAD B (b1) HEAD A (c1) HEAD B (a2) HEAD A+HEAD B (b2) HEAD A (c2) HEAD B (a3) HEAD A+HEAD B (b3) HEAD A (c3) HEAD B

NOTE: DYED PARTS IN FIGURES INDICATE DOTS

REGION aa    REGION ab    REGION bb (a)

(b)

(b1)

(b2)

(b3)

(a1) HEAD A+HEAD B (b1) HEAD A (c1) HEAD B (a2) HEAD A+HEAD B (b2) HEAD A (c2) HEAD B (a3) HEAD A+HEAD B (b3) HEAD A (c3) HEAD B

NOTE: DYED PARTS IN FIGURES INDICATE DOTS (a) (b)

IMAGE RECORDING METHOD AND IMAGE RECORDING DEVICE

This Application is a U.S. National Phase Application under 35 U.S.C. 371 of International Application PCT/JP2009/059860 on May 29, 2009. This Application claims the priority of Japanese Application No. 2008-150888, filed Jun. 9, 2008, the entire contents of both Applications are hereby incorporated by reference.

TECHNICAL FIELD

Present invention relates to an image recording method and an image recording device where by using a line head including a plurality of recording element arrays arranged in one direction such that the recording elements have overlapping regions at the mutually adjoining end portions thereof, a recording material is attached from the recording element onto a recording medium to form a dot for image printing.

Hereinafter, each of the plurality of recording element arrays may be referred as a short recording element array or a short head, and all of the plurality of recording heads structuring a line head may be referred as a long recording element array or a long head.

BACKGROUND TECHNOLOGY

In an inkjet printer and the like, by ejecting an ink (recording material) from a plurality of nozzles (recording elements) an image is formed on a recording sheet (recording medium).

As such the printer, an image recording device exists that utilizes a long line head to cover the main scanning direction of the recording sheet. With this type of image recording device, recording is performed in the main scanning direction with a state of fixing the line head, and by conveying the recording sheet in the perpendicular direction (sub-scanning direction) to the line head direction (main scanning direction), the image can be formed.

Here, the log line head to cover the width of the recording sheet has weak points compared to the short head such as high manufacturing cost, low yield ratio at manufacturing, low reliability, further, need of total expensive line head replacement in case of breakage of a part of the recording elements, and high repairing cost is required.

Against these problems, a method is proposed in Patent Document 1 (Examined Japanese Patent Application Publication No. H04-38589) where a long line head is configured by arranging a plurality of short heads in the direction of nozzle array as shown in FIG. 10.

Although the basic problem can be solved in such the configuration, a new problem is caused. Namely the adjustment between each head is very difficult, and in case of insufficient adjustment, a line shaped false contour is generated at the nozzle boundary area between each short head.

Recently in particular, since resolution of image print tends to increase, measures to cope with this tendency are imperative. For example, in the case of printing with the resolution of 1440 dpi (dpi: dots/inch), the pitch of the recording elements becomes 17 µm.

Against the new problems in the case of configuring a long head by combining short heads, various proposals are available. For example they are: to thin out pixels in the main scanning direction, to thin out in the sub-scanning direction, to stir the boundary, to shift overlapping position by each color in case of color head, and the like.

Further, in Patent Document 2 (Japanese Registration patent No. 3702711), proposed is a method where several recording elements of the short head are overlapped, and the elements are allocated regularly to each head according to the positions, or allocated to disperse irregularly by utilizing random numbers.

PRIOR ART DOCUMENTS

Patent Documents

Patent Document 1: Examined Japanese Patent Application Publication No. H04-38589
Patent Document 2: Japanese Registration patent No. 3702711.

SUMMARY OF THE INVENTION

Problems to be Solved by the Invention

However, there has been a following problem in the method proposed in Patent Document 2. FIG. 11 shows the image, in an error diffusion pattern in the case of dot ratio 50% ((dot ratio=(dot generated pixels/pixels capable of dot generation)×100), where random numbers are generated in the overlapping region and each pixel is allocated to each head according to the random numbers.

As shown in (a1) and (a2) of FIG. 11, in the overlapping region between the two adjacent short heads, allocation is executed. If the two short heads are arranged in ideal conditions when dots are outputted by these two short heads, dots are formed on the recording sheet without problems as shown in FIG. 11($b$).

Further, when an actual print is reproduced by assuming the resolution 1440 dpi, dot diameter 40 µm, with the pattern shown in FIG. 11($b$), print becomes as shown in FIG. 12($a$).

FIG. 12($b$) is a pattern when displacement or imbalance of the adjacent short heads is assumed, in the case of FIG. 12($a$). In FIG. 12($b$) one of the adjacent heads is displaced by a distance of ½ nozzle pitch from the proper position, and the two heads are assumed to be arranged to displace toward separating direction. As can be seen from FIG. 12($b$), by existence of the assumed dislocation, a highly visible blank portion is generated at the portion where dot density of each adjacent head is reduces. Here, three highly visible portions are encircled by dashed lines. In this case, not only generating the blank portions, but also a visible false contour may be generated.

Inventors of the present application has examined this image failure and found out that in cases of separating dot patterns generated by half tone processing to two adjacent heads, when dot allocation is concentrated onto one of the heads in a local area in each dot pattern of heads after the allocation, this type of phenomenon will be caused. The reasoning will be described by the use of FIG. 13.

FIG. 13 illustrates results of dot allocation using a conventional technology to each short head in cases of low dot density, half tone pattern of medium dot density and 100% dot density. In this example, dot allocation utilizing the random numbers is executed to two adjacent short heads near the overlapping region. As can be recognized from these patterns, in every cases of dot densities, agglomerations are generated in the dot patterns allocated by the use of random numbers (FIG. 13($b$)-13($c$)). Incidentally, in FIG. 13 in order to express the dot patterns in the black and white drawings for the patent application, dot densities to be formed by the two short heads are slightly changed.

FIG. 14($a$), ($b$) illustrate dot patterns in the case where in 100% dot ratio image, dot data are allocated to the two short heads, and in addition, each heads is arranged to displaced by ½ nozzle pitch in relatively separating direction. Between FIG. 14(a) and FIG. 14(b), there is a difference in the dot allocations to each short heads. Specifically, in FIG. 14(a), conventional allocation is executed by the use of random numbers, and there exist large uneven distributions (including low frequency component) in the dot pattern shared by each head in the overlapping region after the allocation. In contrast, in FIG. 14(b), allocation is made not to generate the agglomeration of dots in one head by each dot positions, therefore there is no large gap in the dot patterns after allocation in each head in the overlapping region (not including much low frequency component).

As can be recognized by these figures, if there is a large imbalance in the allocated dot pattern, in cases where displacement is generated in the arrangement of short heads, density variation portions (where blanks are generated) tend to be agglomerated (FIG. 14(a)). In contrast, by positively dispersing the allocation positions, the density variation portions (where blanks are generated) are dispersed to become hard to be visible.

Regarding the generation of dot aggregation at the time of dot data allocation, the case of low dot ratio is more noticeable. In the case of lower dot ratio as in FIG. 13(b1), (c1) of low density dot formation, or in FIG. 13(b2), (c2) of mid density dot formation, larger uneven allocations are generated than the primary allocation rule (random number pattern).

Not by using the random numbers, in the case where the allocation rule is made by using patterns having blue noise characteristics (characteristics of distributing every dot with a prescribed distance to the neighboring dot) such as a dot pattern generated by half tone processing with error diffusion processing, at least regarding the 100% dot ratio, dot allocation can be executed to each head without unevenness. However, regarding the low dot density region, unless having any relation between the allocation rule having blue noise characteristics and the dot data after the halftone processing, the pattern allocated to each short heads becomes white noise type (the condition including many of the low frequency components), and the uneven dot data allocation as shown in FIG. 13(b1), (c1) or FIG. 13(b2), (c2) cannot be improved.

Present invention is to solve the above described problems, and to realize an image recording method and an image recording device, where image recording is executed by using a line head including a plurality of recording element arrays arranged in one direction such that the recording elements have overlapping regions at the mutually adjoining end portions thereof, wherein image quality degradation by the dislocation of dots and the like in the overlapping region of the adjoining recording element arrays is prevented.

Means for Solving the Problems

The present invention to solve the above mentioned objectives is as described below.

(1) An image recording method utilizing a line head arranged with a plurality of recording element arrays, each having a plurality of recording elements in one direction, arranged in said one direction such that the recording elements have overlapping regions at the mutually adjoining end portions of the recording element arrays, the image recording method including: a halftone processing step for executing a halftone process of multilevel image data according to a first halftone processing rule to generate a dot pattern as a recording pattern to be recorded by outputting a recording material from a recording element of the plurality of recording elements; an allocation processing step for applying a second halftone process by each pixels constituting the recording pattern formed by the first halftone process to determine which of adjoining recording element arrays records the dot; and a recording step for recording dot data allocated to each of the recording element arrays by using the recording elements of each of the plurality of recording element analyst included in the line head, wherein the second halftone process has a property to suppress a low frequency component of a two-dimensional spatial frequency domain for each of the dot data having been allocated, and judgment of allocating the dot of each pixel position to which of the recording element arrays is determined based on a result of allocation of the pixel position having been already determined.

(2) The image recording method described in claim 1, wherein the allocation processing step by the second halftone process is a process to refer an allocation rate to allocate a dot by each nozzle of one of the recording element arrays in the overlapping region, and to apply the second halftone processing rule to sequentially determine whether or not to allocate the dot of the recording pattern onto one of the recording element arrays by each pixels constituting the recording pattern according to the allocation rate, wherein the allocation processing step comprises: a correction pixel value calculating step for calculating the correction pixel value by correcting an input pixel value of a subject pixel position for executing the allocation processing, by utilizing the allocation rate and a quantization error calculated at the pixel position to which the dot allocation having been determined; a first allocation judgment step, in cases where the subject pixel position is a position for generating a dot in the recording pattern, for comparing whether or not the correction pixel value is larger than a prescribed threshold value, determining according to the result of the comparison whether to allocate a dot of the subject pixel position onto one of the recording element arrays, calculating a result value caused by the determination for the subject pixel position, and calculating a quantization error between the correction pixel value and the result value as a quantization error corresponding to the subject pixel position; and a second allocation judgment step, in cases where the subject pixel position is a position for not forming the dot in the recording pattern, for determining not to allocate the dot onto any of the recording element arrays, calculating a result value caused by the determination for the subject pixel position, and calculating a quantization error between the correction pixel value and the result value as a quantization error corresponding to the subject pixel position.

(3) The image recording method described in claim 2, wherein the allocation rate is determined to become smaller as the position of a recording element comes nearer to an end portion from a central portion of the recording element array.

(4) The image recording method described in any one of claims 1-3, wherein the recording material is an ink, and the recording element is a nozzle for ejecting the ink.

(5) An image recording device including: a line head arranged with a plurality of recording element arrays, each having a plurality of recording elements in one direction, arranged in said one direction such that the recording elements have overlapping regions at the mutually adjoining end portions of the recording element arrays; a halftone processor for executing a halftone process of multilevel image data according to a first halftone processing rule to generate a dot pattern as a recording pattern to be recorded by outputting a recording material from a recording element of the plurality of recording elements; an allocation processor for applying a second halftone process by each pixels constituting the recording pattern formed by the first halftone process to determine which of adjoining recording element arrays records the dot; a drive section to drive the recording elements of each of the plurality of recording element arrays included in the line head for recording dot data allocated to each of the recording element arrays;

wherein the second halftone process has a property to suppress a low frequency component of a two-dimensional spatial frequency domain for each of the dot data having been allocated, and judgment of allocating the dot of each pixel position to which of the recording element arrays is determined based on a result of allocation of the pixel position having been already determined.

(6) The image recording device described in claim 5, wherein the allocation processor utilizing the second halftone process is configured to determine an allocation rate to allocate a dot by each nozzle of one of the recording element arrays in the overlapping region, and to apply the second halftone processing rule to sequentially determine whether or not to allocate the dot of the recording pattern onto one of the recording element arrays by each pixels constituting the recording pattern according to the allocation rate, wherein the allocation processor comprises: a correction pixel value calculating section to calculate the correction pixel value by correcting an input pixel value of a subject pixel position for executing the allocation processing, by utilizing the allocation rate and a quantization error calculated at the pixel position to which the dot allocation having been determined; a first allocation judgment section, in cases where the subject pixel position is a position for generating a dot in the recording pattern, to compare whether or not the correction pixel value is larger than a prescribed threshold value, to determine according to the result of the comparison whether to allocate a dot of the subject pixel position onto one of the recording element arrays, to calculate a result value caused by the determination for the subject pixel position, and to calculate a quantization error between the correction pixel value and the result value as a quantization error corresponding to the subject pixel position; and a second allocation judgment section, in cases where the subject pixel position is a position for not forming the dot in the recording pattern, to determine not to allocate the dot onto any of the recording element arrays, to calculate a result value caused by the determination for the subject pixel position, and to calculate a quantization error between the correction pixel value and the result value as a quantization error corresponding to the subject pixel position.

(7) The image recording device described in claim 6, wherein the allocation rate is determined to become smaller as the position of a recording element comes nearer to an end portion from a central portion of the recording element array.

(8) The image recording device described in any one of claims 5-7, wherein the recording material is an ink, and the recording element is a nozzle for ejecting the ink.

Effects of the Invention

According to the present invention, the effects described below can be obtained.

(1) According to the invention of image recording method described in claim 1, in cases of recording an image by utilizing a line head arranged with a plurality of recording element arrays, each having a plurality of recording elements in one direction, arranged in said one direction such that the recording elements have overlapping regions at the mutually adjoining end portions of the recording element arrays, a halftone process of multilevel image data is executed according to a prescribed halftone processing rule to generate a dot pattern as a recording pattern to be recorded by outputting a recording material from a recording element; an allocation process is executed based on the recording pattern to determine which of adjoining recording element arrays records the dot by utilizing a halftone processing rule to suppress a low frequency component of a spatial frequency, and recorded is the dot data allocated to each of the recording element arrays by using the recording elements of each of the plurality of recording element arrays included in the line head. Further in a frequency space of each dot data allocated to the recording element arrays, the low frequency component is relatively less than the high frequency component.

Due to the above, in cases of recording an image by utilizing a line head arranged with a plurality of recording element arrays, each having a plurality of recording elements in one direction, arranged in said one direction such that the recording elements have overlapping regions at the mutually adjoining end portions, since the dot data is generated by the use of the halftone processing rule that suppresses low frequency components of the spatial frequency, according to the result of the halftone process, the dot pattern (recording pattern) as the result of halftone process and the dot data obtained by the allocation process get to have a correlation, and the low frequency component allocated to each recording element becomes easy to be decreased. Accordingly even displacements of dots exist in the overlapping region of adjoining short heads, a lump of blank area is hardly caused and deterioration of image quality will not occur.

(2) According to the invention of image recording method described in claim 2, the allocation processing step by the second halftone process is a process to refer an allocation rate to allocate a dot by each nozzle of one of the recording element arrays in the overlapping region, and to apply the second halftone processing rule to sequentially determine whether or not to allocate the dot of the recording pattern onto one of the recording element arrays by each pixels constituting the recording pattern according to the allocation rate, wherein the allocation processing step includes: a correction pixel value calculating step for calculating the correction pixel value by correcting an input pixel value of a subject pixel position for executing the allocation processing, by utilizing the allocation rate and a quantization error calculated at the pixel position to which the dot allocation having been determined; a first allocation judgment step, in cases where the subject pixel position is a position for generating a dot in the recording pattern, for comparing whether or not the correction pixel value is larger than a prescribed threshold value, determining according to the result of the comparison whether to allocate a dot of the subject pixel position onto one of the recording element arrays, calculating a result value caused by the determination for the subject pixel position, and calculating a quantization error between the correction pixel value and the result value as a quantization error corresponding to the subject pixel position; and a second allocation judgment step, in cases where the subject pixel position is a position for not forming the dot in the recording pattern, for determining not to allocate the dot onto any of the recording element arrays, calculating a result value caused by the determination for the subject pixel position, and calculating a quantization error between the correction pixel value and the result value as a quantization error corresponding to the subject pixel position. Accordingly, allocation of locally lumped dot data to one recording element array is prevented, and desired dot allocation rate can be realized. As the result, the low frequency components are decreased in the dot pattern allocated to each recording element arrays. Accordingly even displacements of dots exist in the overlapping region of adjoining short heads, a lump of blank area is hardly caused and deterioration of image quality will not occur.

(3) According to the invention of image recording method described in claim 3, the allocation rate allotted according to the position of the recording element is determined to become smaller as the position of a recording element comes nearer to an end portion from a central portion of the recording element array. Therefore, connection of recording by the adjoining recording element arrays becomes smooth, and generation of blank area is suppressed not to cause image quality deterioration.

(4) According to the invention of image recording method described in claim 4, in cases of recording an image by utilizing a line head arranged with a plurality of recording element arrays, each having a plurality of recording elements in one direction, arranged in said one direction such that the recording elements have overlapping regions at the mutually adjoining end portions of the recording element arrays, when ejecting an ink toward a recording medium, even displacements of dots exist in the overlapping region of adjoining short heads, a lump of blank area is hardly caused and deterioration of image quality will not occur.

(5) According to the invention of image recording device described in claim 5, in cases of recording an image by utilizing a line head arranged with a plurality of recording element arrays, each having a plurality of recording elements in one direction, arranged in said one direction such that the recording elements have overlapping regions at the mutually adjoining end portions of the recording element arrays, a halftone process of multilevel image data is executed according to a prescribed halftone processing rule to generate a dot pattern as a recording pattern to be recorded by outputting a recording material from a recording element; an allocation process is executed based on the recording pattern to determine which of adjoining recording element arrays records the dot by utilizing a halftone processing rule to suppress a low frequency component of a spatial frequency; and recorded is the dot data allocated to each of the recording element arrays by using the recording elements of each of the plurality of recording element arrays included in the line head. Further in each dot data allocated to each recording element arrays obtained by this allocation process, locally uneven allocation is reduced in any of the dot patterns.

Due to the above, in cases of recording an image by utilizing a line head arranged with a plurality of recording element arrays, each having a plurality of recording elements in one direction, arranged in said one direction such that the recording elements have overlapping regions at the mutually adjoining end portions, since the dot data is generated by the use of the halftone processing rule that suppresses low frequency components of the spatial frequency, according to the result of the halftone process, the dot pattern (recording pattern) as the result of halftone process and the dot data obtained by the allocation process get to have a correlation, and the low frequency component allocated to each recording element becomes easy to be decreased. Accordingly even displacements of dots exist in the overlapping region of adjoining short heads, a lump of blank area is hardly caused and deterioration of image quality will not occur.

(6) According to the invention of image recording device described in claim 6, the allocation processor by the second halftone process is configured to determine an allocation rate to allocate a dot by each nozzle of one of the recording element arrays in the overlapping region, and to apply the second halftone processing rule to sequentially determine whether or not to allocate the dot of the recording pattern onto one of the recording element arrays by each pixels constituting the recording pattern according to the allocation rate, wherein the allocation processor includes: a correction pixel value calculating section for calculating the correction pixel value by correcting an input pixel value of a subject pixel position for executing the allocation processing, by utilizing the allocation rate and a quantization error calculated at the pixel position to which the dot allocation having been determined; a first allocation judgment section, in cases where the subject pixel position is a position for generating a dot in the recording pattern, for comparing whether or not the correction pixel value is larger than a prescribed threshold value, determining according to the result of the comparison whether to allocate a dot of the subject pixel position onto one of the recording element arrays, calculating a result value caused by the determination for the subject pixel position, and calculating a quantization error between the correction pixel value and the result value as a quantization error corresponding to the subject pixel position; and a second allocation judgment section, in cases where the subject pixel position is a position for not forming the dot in the recording pattern, for determining not to allocate the dot onto any of the recording element arrays, calculating a result value caused by the determination for the subject pixel position, and calculating a quantization error between the correction pixel value and the result value as a quantization error corresponding to the subject pixel position. Accordingly, allocation of locally lumped dot data to one recording element array is prevented, and desired dot allocation rate can be realized. As the result, the low frequency components are decreased in the dot pattern allocated to each recording element arrays. Accordingly even displacements of dots exist in the overlapping region of adjoining short heads, a lump of blank area is hardly caused and deterioration of image quality will not occur.

(7) According to the invention of image recording device described in claim 7, the allocation rate allotted according to the position of the recording element is determined to become smaller as the position of a recording element comes nearer to an end portion from a central portion of the recording element array. Therefore, connection of recording by the adjoining recording element arrays becomes smooth, and generation of blank area is suppressed not to cause image quality deterioration.

(8) According to the invention of image recording device described in claim 8, in cases of recording an image by utilizing a line head arranged with a plurality of recording element arrays, each having a plurality of recording elements in one direction, arranged in said one direction such that the recording elements have overlapping regions at the mutually adjoining end portions of the recording element arrays, when ejecting an ink toward a recording medium, even displacements of dots exist in the overlapping region of adjoining short heads, a lump of blank area is hardly caused and deterioration of image quality will not occur.

DESCRIPTION OF THE EMBODIMENT

Figure 1:
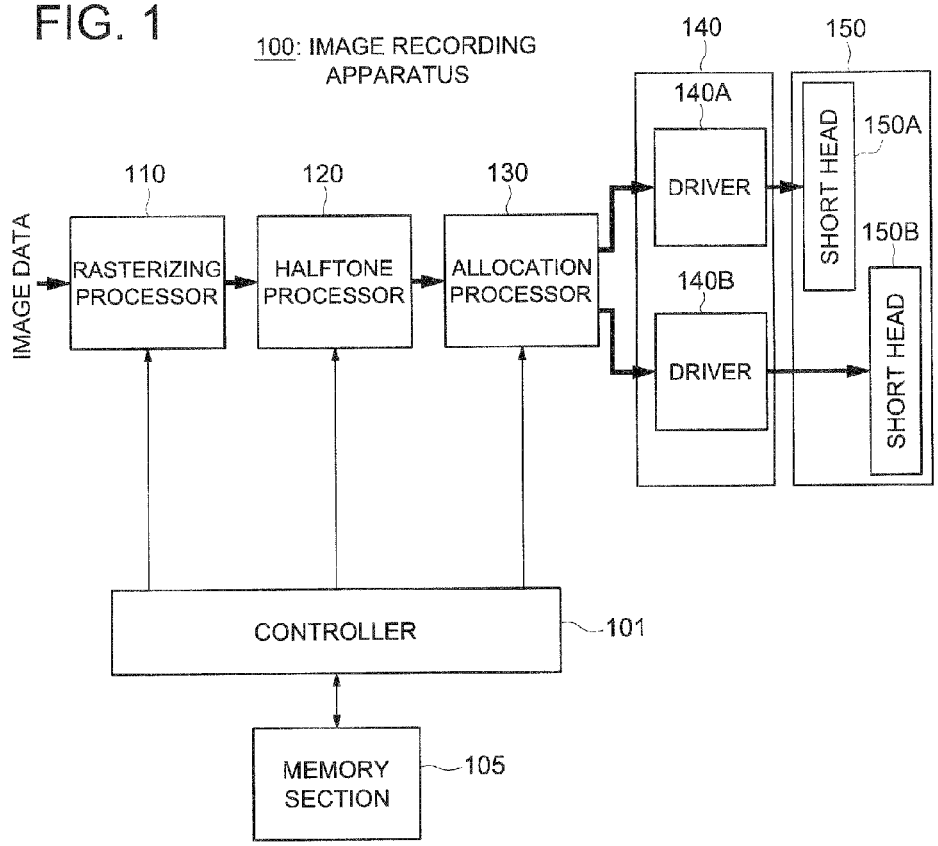
FIG. 1 is a block diagram showing a configuration of an image recording device relating to an embodiment of the present invention.

Hereinafter, referring to the drawings, the first embodiment will be described. First, the image recording method and the image recording device will be described as the embodiments of the present invention.

In the embodiment described below, as the image recording device, an inkjet printer is exemplified for a specific example. Accordingly, an ink corresponds to the recording material, and a nozzle for ejecting the ink corresponds to the recording element.

(1) Configuration of the Embodiment

In the embodiment, structural elements relating to characteristic features of the image recording device 100 will be described. Therefore, basic structural elements such as a commonly known electrical power circuits and power switches are omitted.

Controller 101 executes various controls for image formation. In the present invention, in cases of recording an image by using a line head including a plurality of recording element arrays arranged in one direction (main scanning direction in the present embodiment) such that the recording elements have overlapping regions at the mutually adjoining end portions thereof, controller 101 executes various controls for conducting a halftone processing step for executing halftone processing of multilevel image data according to a prescribed halftone processing rule (a first halftone processing rule) to form a pattern of dot to be recorded by outputting a recording material from the recording element as a recording pattern; and an allocation processing step for forming a division pattern, based on the recording pattern formed by the halftone processing, for allocating the pattern of dot to be recorded to either of the adjoining overlapping recording element arrays; and a recording step for driving the recording element such that the allocated dot is recorded by the recording element included in each of the short element arrays.

Memory section 105 is a storage means to store image data and various types of data, and in the present embodiment specifically stores as matrix patterns various types of data of dither matrix patterns such as a green noise and a blue noise, and a error diffusion matrix pattern to be used for error diffusion process.

Rasterizing processor 110 is an image processing means for converting various forms of image data such as a vector data received from an external computer into raster data such as a bitmap.

Halftone processor 120 is a halftone processing means for generating dots in the state of expressing a halftone with error diffusion of multilevel data based on the prescribed halftone processing rule (the first halftone processing rule). In the present embodiment, the halftone processing (having a blue noise property or a green noise property) to suppress the low frequency component is utilized. Halftone processor 120 generates the dot to be recorded as a recording pattern by the various processing such as dither, error diffusion, blue noise or green noise as the prescribed halftone processing rule.

Allocation processor 130 is an allocation processing means for forming a division pattern, for allocating the dot to be recorded to either of the adjoining overlapping recording element arrays, based on the recording pattern formed by the halftone processing, and executing the allocation processing.

Since the allocation processor 130 forms, as the prescribed allocation processing rule, an allocation processing rule based on the halftone processing result, consequently the halftone processing and the allocation processing become to have correlation.

Drive section 140 is a driver means to eject ink by driving each recording elements included in each short head (short recording element array) to be described later. In the present embodiment, drive section 140 is configured with driver 140A and driver 140B.

Line head 150 is configured as a long recording element array in which a plurality of short line heads (short recording element arrays) arranged in one direction such that the recording elements in each short line heads have overlapping regions at the mutually adjoining end portions. In the present embodiment, line head 150 is configured with short head 150A and short head 150B.

Figure 2:
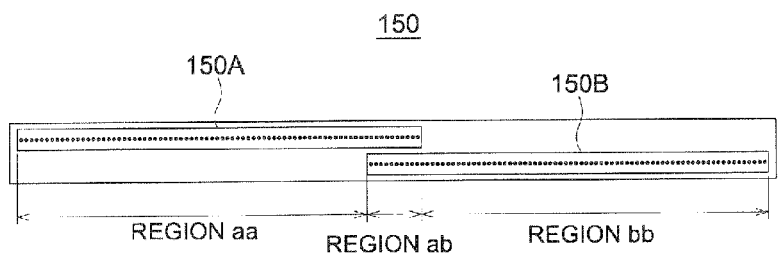
FIG. 2 is a drawing showing an arrangement of a recording element of the image recording device relating to an embodiment of the present invention.

In the present embodiment, the layout of line head 150 configured with two short heads in FIG. 1 is illustrated in FIG. 2. Here, the region where dots are formed only by the short head 150A, along the direction of recording media being conveyed, is assumed to be REGION aa. Similarly, the region where dots are formed only by the short head 150B, along the direction of recording media being conveyed, is assumed to be REGION bb. And, the region where dots are formed by both the short head 150A and the short head 150B is assumed to be REGION ab. FIG. 2 shows an aspect to be seen from an ink ejecting side of line head 150. Here the number of recording elements included in each short heads is schematically illustrated, however much more recording elements are actually arranged according to a density of image recording. Further, the line head 150 is actually configured with many more short heads.

Figure 3:
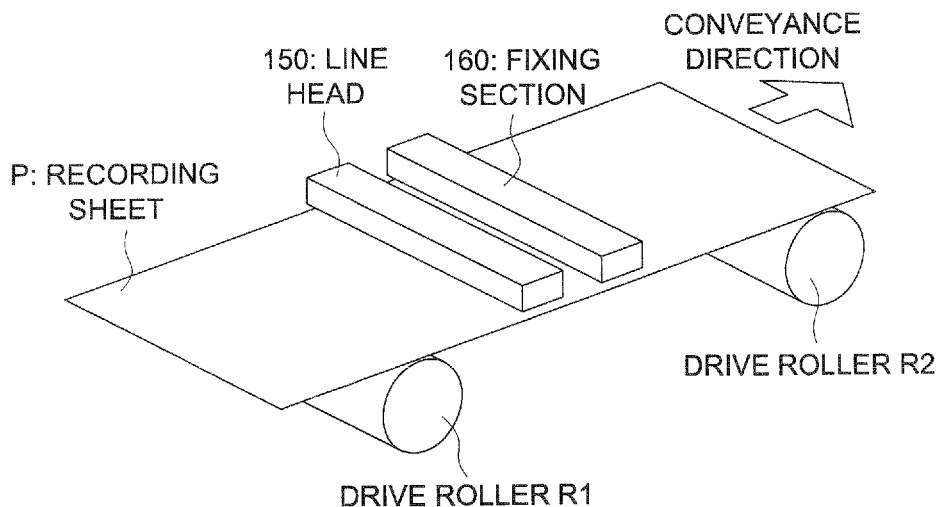
FIG. 3 is a perspective view showing a structure of the image recording device relating to an embodiment of the present invention.

Further, as illustrated in the perspective view of FIG. 3, image recording device 100 ejects ink from each recording elements of line head 150 to a recording sheet while conveying the recording sheets by conveyance rollers R1 and R2. Further as necessary, fixing section 160 irradiates heats or ultraviolet rays to the ink on the recording sheet for fixing the recorded image.

(2) Total Processing in the Embodiment

Hereinafter, behaviors (image recording method) of the image recording device will be described referring to a flow chart.

Figure 4:
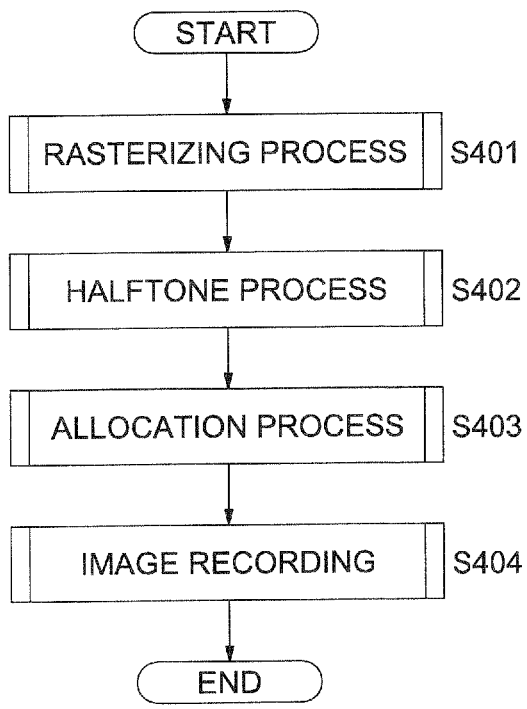
FIG. 4 is a flow chart showing a processing of an embodiment of the present invention.

FIG. 4 illustrates a flow chart showing schematic behaviors at the time of recording of image forming device 100 of the present embodiment.

In the image recording device 100, rasterizing processor 110 converts various forms of image data such as a vector data received from an external computer into raster data such as a bitmap (step S401 in FIG. 4). In this case, the bitmap data from the external or the converted raster data of bitmap format is stored in memory section 105 as necessary.

Then, in cases where an image is composed of multilevel data having a gradation, image recording device 100 executes a halftone process in order to express the gradation by pseudo gradation using the binary of ejection or non-ejection of the ink (step S402 in FIG. 4).

More specifically, half tone processor 120 quantizes the multilevel data based on a prescribed halftone processing rule to generate a halftone data (the data corresponding to the dot). In the present embodiment halftone processor 120 utilized an error diffusion method as the prescribed halftone processing rule, however, commonly known halftone technologies such as a least mean error method or dither method can be used other than the error diffusion method. By this halftone process, the dot data to be recorded is generated.

Here, with respect to the above-described overlapping region (REGION ab in FIG. 2), data allocation process for each pixel is executed to determine the head associated with the recording of each dot, namely to determine which of the short heads 150A or 150E included in the line head 150 executes the recording (step S403 in FIG. 4).

Namely, allocation processor 130 executes the allocation process to form a two-dimensional division pattern distributed in main scanning direction and sub-scanning direction for allocating which of the two adjacent short heads in the overlapping region executes the recording.

Then, regarding the REGION aa by short head 150A, REGION bb by short head bb, REGION ab by either of short head 150A or short head 150B which is determined by the allocation process, the ink is ejected to the recording sheet to perform image recording (step S404 in FIG. 4).

(3) Detailed Processing in the Embodiment (3-1) Halftone Process

Here, referring to FIG. 5, the halftone process by halftone processor 120 (step S402 in FIG. 4), namely dot pattern generation process will be described in detail.

Here, the halftone process will be described in the case of using the error diffusion. As the halftone process (step S402 in FIG. 4), the halftone processor 120 generates the data processed with the halftone process by executing the process explained below with respect to each pixel of raster data in bitmap format. Herein, the pixel is the smallest unit to determine whether or not to generate a dot in a print image resolution, and the resolutions of the pixel and the dot are identical with each other.

Figure 5:
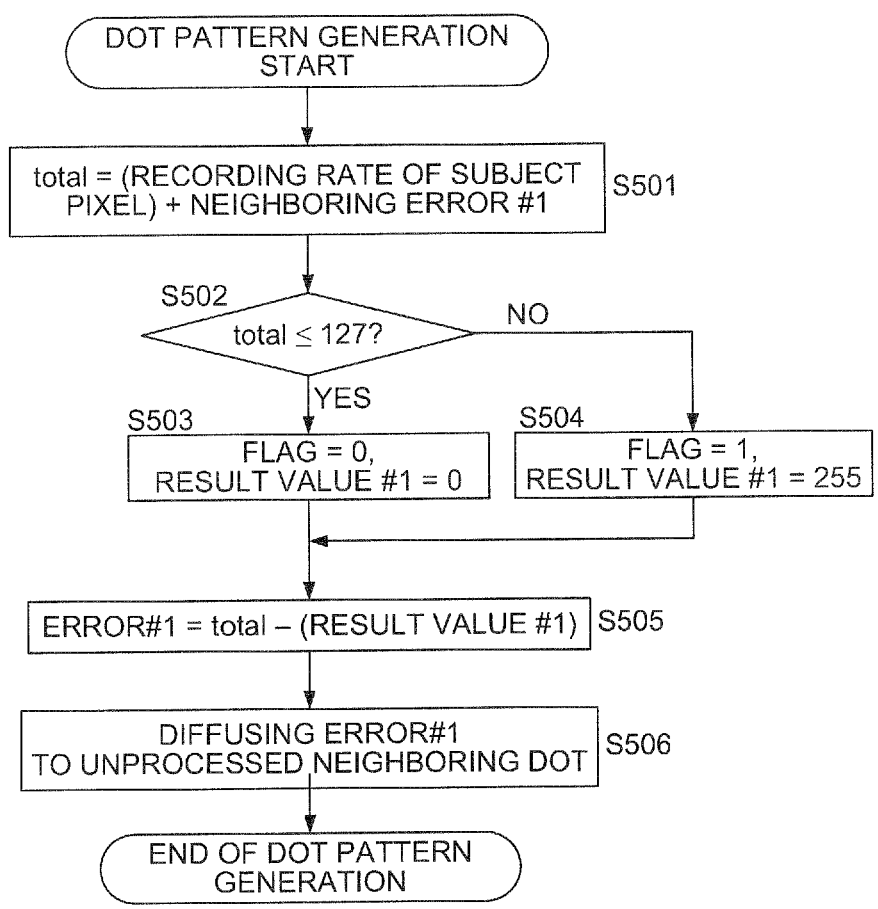
FIG. 5 is a flow chart showing a processing of an embodiment of the present invention.

In FIG. 5, regarding the raster data of bitmap format, the process of subsequently extracting the subject coordinates to be processed from the initial value to the final value is omitted, and mainly indicated are processes regarding each dots. Here, the case where pixel value of each dot being 8 bits (value: 0-255) is exemplified.

Firstly, by adding an input pixel value of the subject pixel (here, the value is: 0-255 for the example of 8 bits) and a neighboring error #1 which is generated by diffusing the error component ERR#1 to neighboring pixels (in step S506 described below), a halftone judgment value "total" is obtained.

Then, whether this halftone judgment value "total" is equal or less than a threshold value, here equal or less than 127 which being a half value of 1-255, is determined (step S502 in FIG. 5).

In cases where this "total" is not more than 127 (YES in step S502 in FIG. 5), by determining not to generate a recording dot, FLAG=0 is set that means not to generate a dot, and set a result value #1 to be 0 (step S503 in FIG. 5), the result value being used in the error diffusion calculation described below.

Here, in cases where the "total" is greater than 127 (NO in step S502 in FIG. 5), by determining to generate a recording dot, FLAG=1 is set that means to generate a dot, and set a result value #1 to be 255 (step S504 in FIG. 5).

Regarding the FLAG; in the case of FLAG=1, namely the case of generating a dot, the FLAG is used in the allocation process described below for determining which of the short heads should be applied to output the dot. Next, when the FLAG which means a recording dot is set, the error component ERR#1 will be obtained. Here, the error component "1 is obtained as a difference between the halftone judgment value "total" and the result value #1, namely ERR#1="total"−result value #1 (step S505 in FIG. 5).

Namely, the difference between the halftone judgment value "total" and the result value #1 set in step S503 and S504 becomes an error component in the error diffusion.

Then, this error component ERR#1 is distributed by using a diffusion pattern stored in memory section 105 with diffusion of certain ratio to an unprocessed neighboring dots in the periphery of the subject pixel (step S506 in FIG. 5).

Namely, in order to express the image smoothly by the halftone process as the error diffusion, distributes the error caused by generating the dot (S502, S503, and S504), and after that executes the total halftone process in the light of the effect of distributing the error to minimize the error in total. As the diffusion pattern, publicly known various types of diffusion patterns such as Floyed & Stainberg type and Shiau-Fan type can be utilized.

The above described series of processes are executed on the subject pixel shifted in order of the raster. And by executing the halftone process on every pixel, when the coordinate of the subject pixel reached at the final position, the above process terminates.

Meanwhile, regarding the FLAG date obtained by the halftone processor 120 at each pixel, controller 101 stores in memory section 105 by correlating to each pixel position.

(3-2) Data Allocation Process (FIG. 4, S403)

Figure 6:
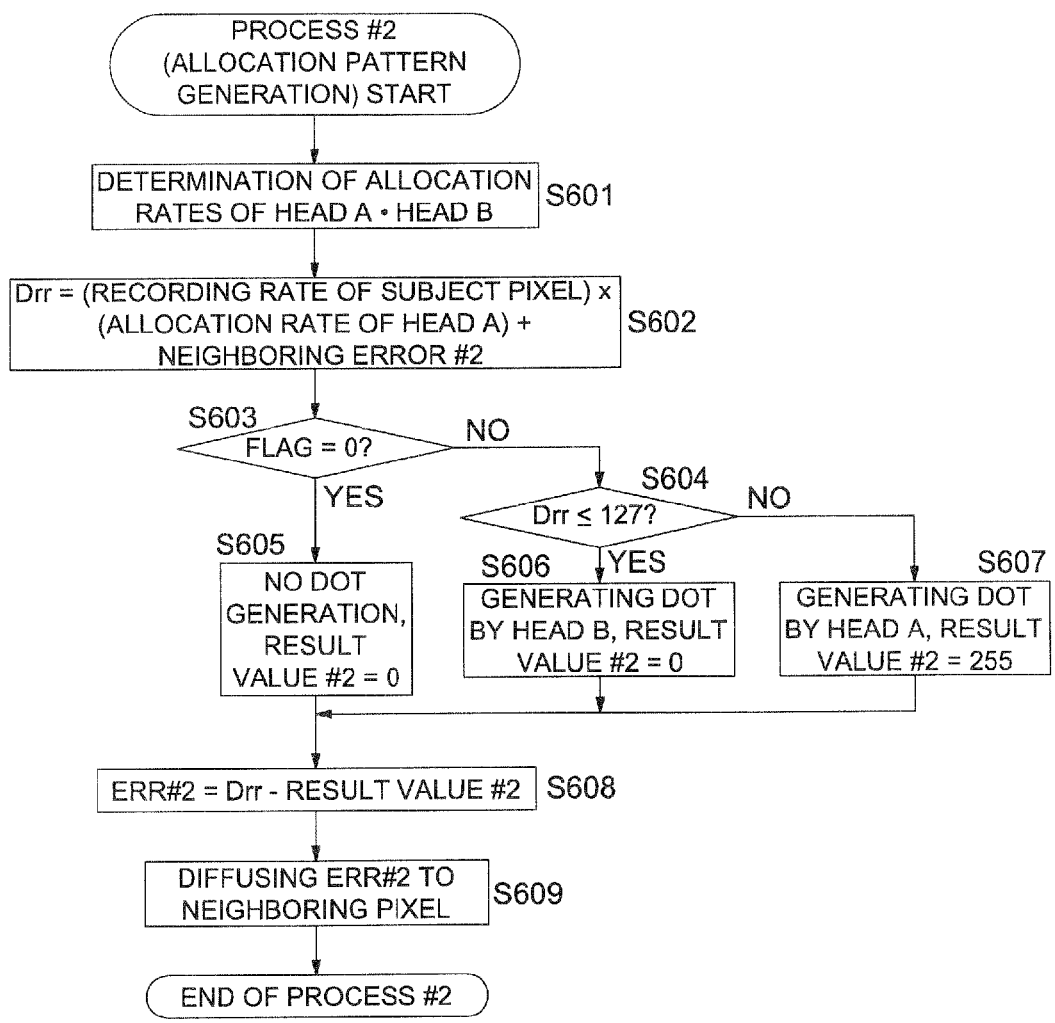
FIG. 6 is a flow chart showing a processing of an embodiment of the present invention.

Referring to FIG. 6, data allocation process (step S403 in FIG. 4) by allocation processor 130 will be described in detail.

As the data allocation process, especially in the overlapping region of plurality of short heads included in the line head 150 (REGION ab in FIG. 2), the data allocation processor 130 determines which of the short heads 150A or 150B is associated with the recording of each dot.

The allocation processor 130 is specific in generating a division pattern which allocates the recording to either one of the adjoining short recording element arrays in the overlapping region (REGION ab in FIG. 2), in accordance with the recording pattern formed in the halftone process.

To be more specific, by the second halftone process the allocation processor 130 determines which of the adjoining short recording element arrays records the dot, by each pixel composing the recording pattern generated by the first halftone process. And the second halftone process has a property of suppressing the low frequency components in two-dimensional spatial frequency domain of each dot data after the allocation, further judgment of allocating the dot at each pixel position to which of the recording element arrays is determined based on result of allocation of the pixel position having been already determined.

The allocation processor 130 preferably generates the above-described division pattern in such a way as to refer the allocation rate for each short recording element array according to the position in the overlapping region, by taking the error having diffused from an already allocated position into account, to determine which of short recording element arrays records the dot according to the dot generation position in the recording pattern, and to diffuse the error generated by the determination onto neighboring position having not been applied the allocation process.

To be more specific, the allocation processor 130 utilizing the second halftone process is configured to determine the allocation rate to allocate a dot by each nozzle for one of the short recording element arrays in the overlapping region, and to apply the second halftone processing rule to sequentially determine whether or not to allocate the dot of the recording pattern onto the recording element array by each pixels constituting the recording pattern according to allocation rate, wherein the allocation processor 130 preferably includes:

a correction pixel value calculating means which calculates the correction pixel value by correcting an input pixel value of a subject pixel position utilizing the allocation ratio and a quantization error calculated at the pixel position to which the dot allocation having been determined;

a first allocation judgment means which, in cases where the subject pixel position is a position for generating the dot in the recording pattern, compares whether or not the correction pixel value is larger than a prescribed threshold value, determines according to the result of the comparison whether to allocate the dot of the subject pixel position onto the short recording element array, calculates a result value for the subject pixel based on the determination of allocation, and calculates a quantization error between the correction pixel value and the result value as a quantization error corresponding to the subject pixel position; and a second allocation judgment means which, in cases where the subject pixel position is a position for not generating the dot in the recording pattern, determines not to allocate the dot onto any of the recording element arrays, calculates a result value for the subject pixel based on the determination, and calculates a quantization error between the correction pixel value and the result value as a quantization error corresponding to the subject pixel position.

An equivalent method to the above-described method can achieve a similar effect to the present embodiment, where by holding the error generated by the allocation at the position having been allocated, and at the time of executing the allocation at the dot generating position in the recording pattern, determined is which of the short recording element arrays is used for recording by taking into account the error being held in the neighboring position having been allocated. Further, not being limited to the above, configurations where the recording pattern is allocated similarly to the present embodiment can achieve the similar effect to the present embodiment, where by utilizing halftone methods such as a blue noise characteristics and a green noise characteristics having suppressed low frequency components and a dot alignment is statistically selected with keeping the distance between dots.

In this case, a matrix for allocating the error to the un-allocated neighboring pixel position, or a matrix for taking the error being held at the pixel position having been allocated into account, a distribution coefficient matrix which being utilized in the commonly known error diffusion method or least mean error method may be used.

First, the allocation processor 130 determines the allocation rates allotted according to positions for each of the short recording element arrays at the overlapping region (step S601 in FIG. 6). The allocation rate may be determined at this stage, or the allocation rate may be previously determined and stored in the memory section 105 in order that the allocation processor 130 can read out the allocation rates as necessary via controller 101.

Figure 7:
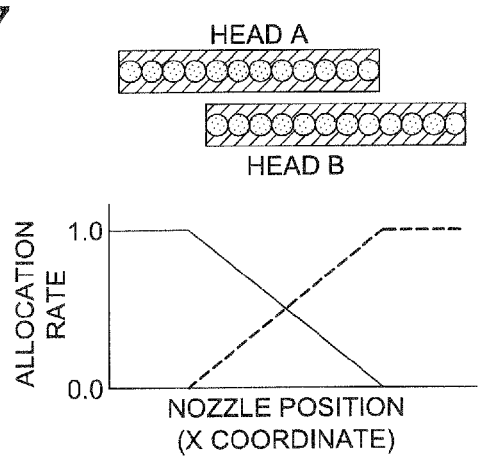
FIG. 7 is a drawing illustrating an example of allocation rate of an embodiment of the present invention.

The allocation rate in the overlapping region of short heads 150A and 150B (REGION ab in FIG. 2), for example as shown in FIG. 7, is determined such that: the allocation rate of adjacent position to not-overlapping region (REGION aa of short head 150A, or REGION bb of short head 150B) is set to be 1.0 (100%), the allocation rate of far end position to the not-overlapping region is set to be 0.0 (0%), and the allocation rates in-between gradually varies with keeping the sum of each short head side rates to be 1.0 (100%). Namely the allocation rate has a property to gradually vary, from 1 to 0, from non-end portion toward end portion, in the overlapping region. By using this type of rate, the border between the two short head in the overlapping region becomes hard to make out. As for this property of the rates, although the example in FIG. 6 is shown as linear, not being limited to this, a curved line type may be possible as far as satisfying the above conditions.

Then, calculates an allocation judgment value Drr by multiplying the allocation rate (0 to 1) of head A (short head 150A) obtained from the subject pixel onto the input value of the subject pixel (0 to 255 in this case, since the example of 8 bits is used), and further adding the neighboring error #2 (which is an error component given from the neighboring pixels, and corresponds to the quantization error calculated at the pixel position to which the dot allocation having been determined in the present invention).

Since as the Drr here is obtained by using the allocation rate of head A, if Drr is greater than the threshold value the allocation is to head A, and if Drr is not greater than the threshold value the allocation is to head B. While, by using the allocation rate of head B, a reversed logic can be applicable.

Then, a flag value is judged which means a recording dot determined in the above halftone process (step S603 in FIG. 6).

If FLAG=0 (YES in step S603 in FIG. 6), since this means not to generate the recording dot, the determination of allocation is not done and set the result value #2, which will be used in a calculation of error diffusion described below, to 0 (step S605 in FIG. 6).

If FLAG=1 (NO in step S603 in FIG. 6), in order to generate the recording dot, the decision of allocation will be executed as below.

If FLAG=1 here (NO in step S603 in FIG. 6), and the allocation judgment value Drr is not greater than the threshold value 127 (YES in step S604 in FIG. 6), determination is made to generate the dot at the side of short head 150B, and the result value #2, which will be used for the calculation of error diffusion described below, is set to be 0 (step S606 in FIG. 6).

Further, if FLAG=1 here (NO in step S603 in FIG. 6), and the allocation judgment value Drr is greater than the threshold value 127 (NO in step S604 in FIG. 6), determination is made to generate the dot at the side of short head 150A, and the result value #2, which will be used for the calculation of error diffusion described below, is set to be 255 (step S607 in FIG. 6).

Next, error component ERR#2 is obtained. Here, the error component ERR#2 is obtained as the difference between the allocation judgment value Drr and the result value #2, namely ERR#2=Drr−(result value #2) (step S608 in FIG. 6).

Namely, the difference between the allocation judgment value Drr obtained in step S602 and the result value #2 set in steps S605-S607 becomes an error component in the error diffusion process. The error component corresponds to the quantization error corresponding to the subject pixel in the present invention.

The flow after the determination of FLAG=1 at the step S603, from S604 through S606 or S607 to S608 corresponds to the first allocation judgment step in the present invention, and the flow after the determination of FLAG=0 at the step S603, through S605 to S608 corresponds to the second allocation judgment step in the present invention.

Thereafter, the error component ERR#2 is distributed to the unprocessed neighboring dots surrounding the subject pixel by diffusing with prescribed rates.

Namely the error diffusion process, in order to express the image by the halftone process, distributes the error generated by the dot allocation process (S605, S606, S607) onto the neighboring pixels, thereafter executes the total allocation process by taking the effect of error distribution into account to minimize the error in total.

The above allocation process is executed, similarly to the halftone process, with respect to the subject pixel shifted in raster order. And, when the coordinate of the subject pixel reached the final position, the above allocation process completes.

Regarding the result of allocation for each dot (recording head information) obtained by the process of allocation processor 130, controller 101 stores in memory section 105 by correlating the each dot to the pixel position.

Figure 12:
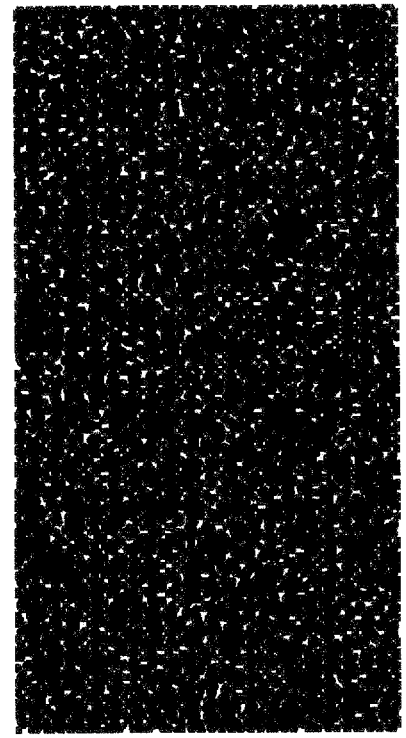
FIG. 12 is drawings illustrating the aspects of recording in the conventional image recording device.
Figure 12:
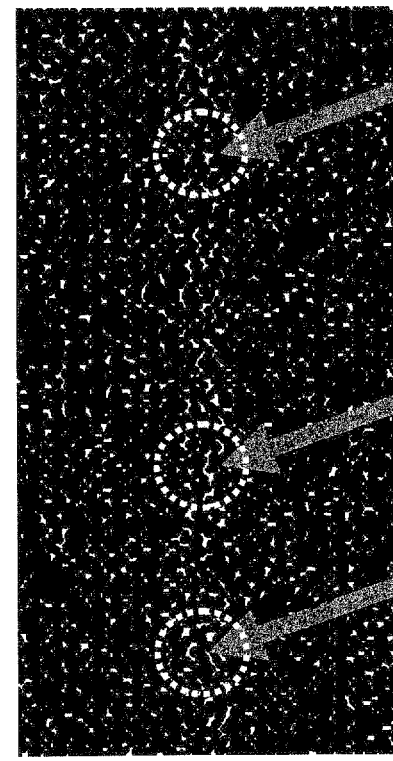

By executing the above allocation process, since the low frequency components of the dot pattern allocated to each head in the overlapping region are suppressed, even displacement of dot exists in the overlapping region of adjoining short heads, a lump of blank area is hardly caused and deterioration of image quality will not occur. Namely the lump of blank area as shown in FIG. 12(b) that has been caused in the case of forming the pattern of the heads using the conventional allocation means becomes hard to be caused, and image quality deterioration will not be caused.

Regarding the halftone process (S402) and the allocation process (S403) of FIG. 4, in the present embodiment, after the halftone process is applied to all the pixels, allocation process is applied again in the overlapping region. However, since the result of allocation processor is not reflected to the halftone processor, the configuration is possible where the halftone process and the allocation process are applied by each pixel and these processes are further applied to all the pixels in raster order, if the order of the allocation process is assured to be after the halftone process. By doing so, the amount of processing can be reduced compared to the above-described embodiment.

Figure 8:
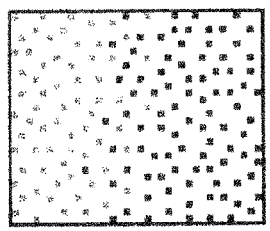
FIG. 8 is drawings illustrating the aspects of recording in an embodiment of the present invention.
Figure 8:
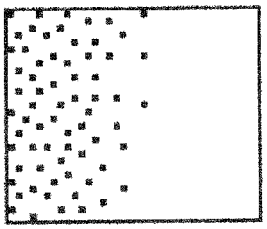
Figure 8:
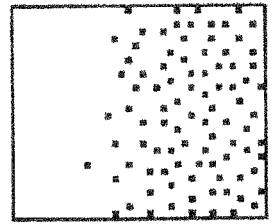
Figure 8:
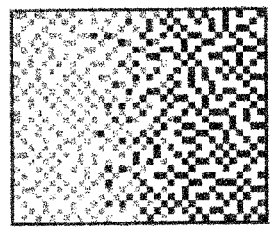
Figure 8:
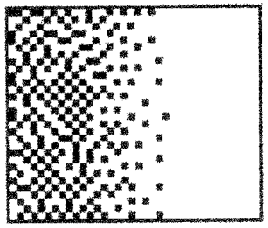
Figure 8:
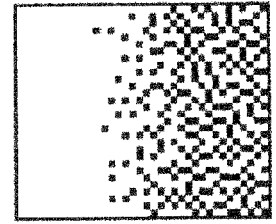
Figure 8:
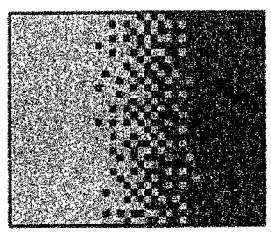
Figure 8:
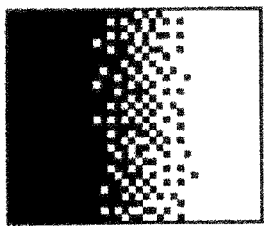
Figure 8:
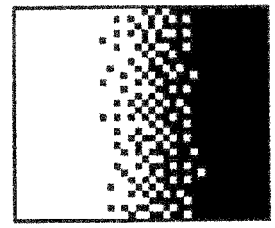

The result of allocating the halftone pattern to each short heads by the use of the present embodiment is shown in FIG. 8. FIG. 8 corresponds to FIG. 13 which is formed by using the conventional art. Herein, in order to express the feature in the drawings of the present patent application, dot densities formed by the two short heads are somewhat changed from each other.

Figure 13:
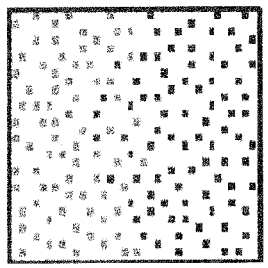
FIG. 13 is drawings illustrating the aspects of recording in the conventional image recording device.
Figure 13:
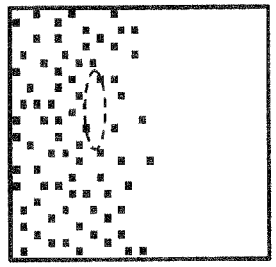
Figure 13:
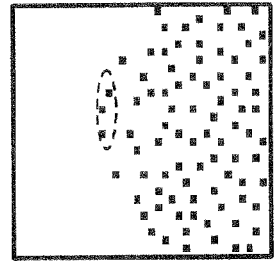
Figure 13:
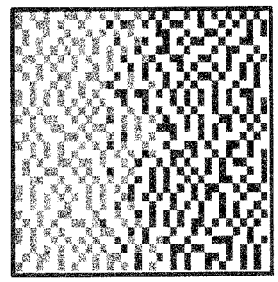
Figure 13:
Figure 13:
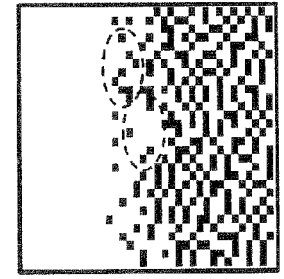
Figure 13:
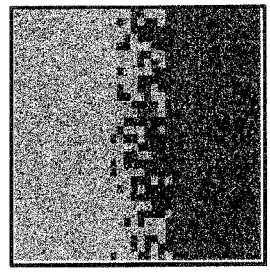
Figure 13:
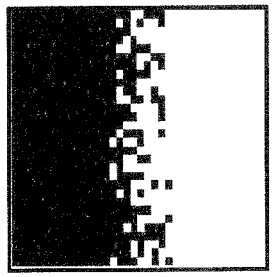
Figure 13:
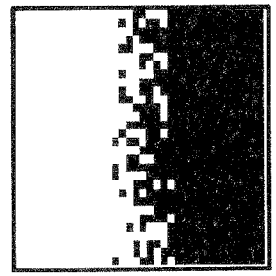
Figure 14:
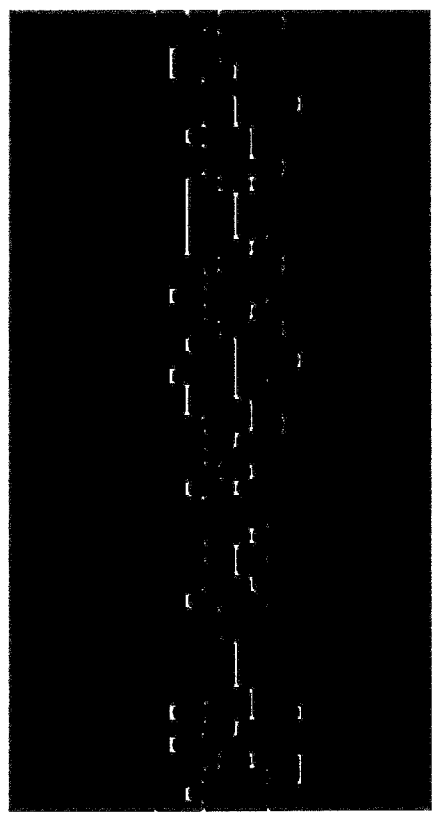
FIG. 14 is drawings illustrating the aspects of recording in the conventional image recording device.
Figure 14:
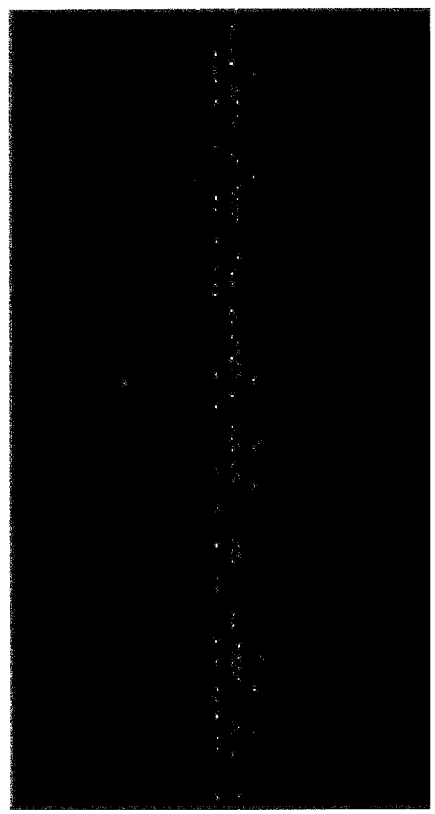

In cases of 100% dot generation as shown in FIG. 8(a3), similarly to the case of FIG. 13, dots are approximately evenly allocated as shown in FIGS. 13(b3) and 13(c3).

In cases of low density dot formation as shown in FIG. 8(a1), dots are evenly allocated as shown in FIGS. 8(b1) and 8(c1), without having protruded portions as in FIGS. 13(b1) and 13(c1).

Further, in cases of medium density dot formation as shown in FIG. 8(a2), dots are evenly allocated as shown in FIGS. 8(b2) and 8(c2), without having protruded portions as in FIGS. 13(b2) and 13(c2).

Figure 9:
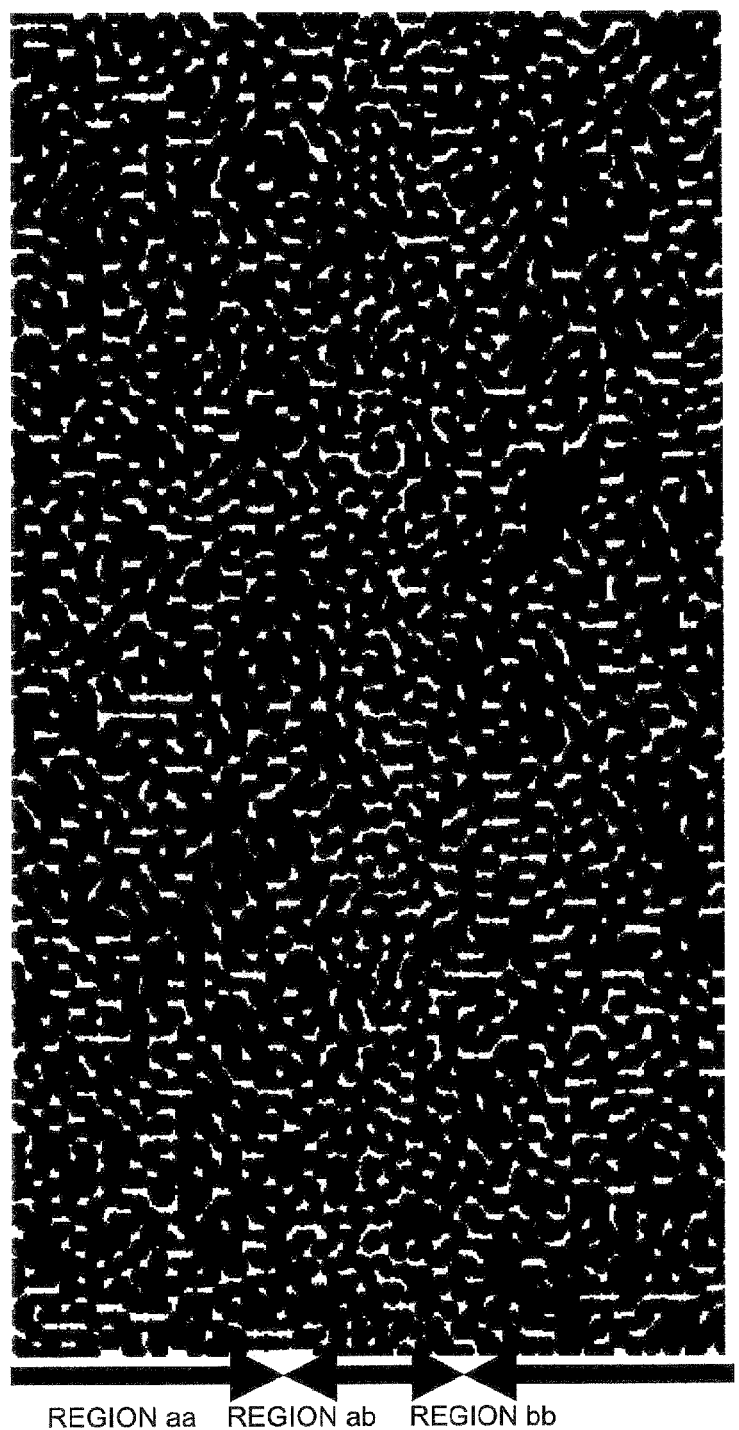
FIG. 9 is a drawing illustrating the aspect of recording in an embodiment of the present invention.
Figure 10:
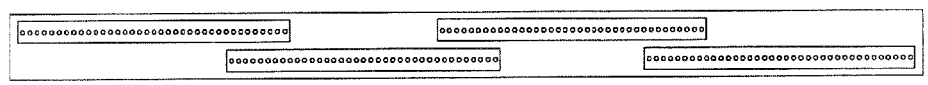
FIG. 10 is a drawing illustrating a configuration of the commonly-used long line head.
Figure 11:
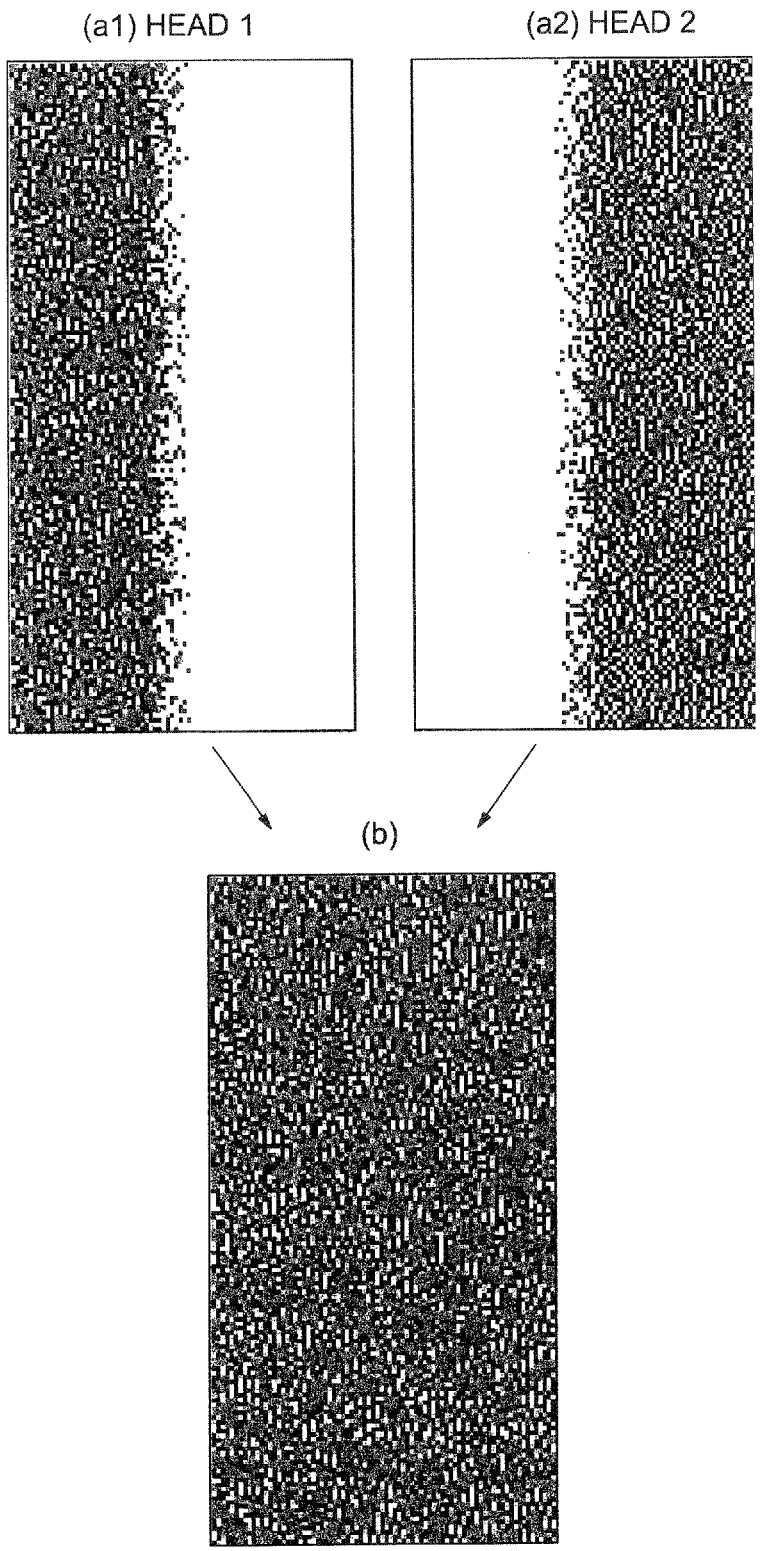
FIG. 11 is drawings illustrating the aspects of recording in the conventional image recording device.

The result of dot distribution pattern according to the present embodiment is shown in FIG. 9 in a case where each short heads is arranged to displace toward separating direction with each other by ½ nozzle pitch as in the case of FIG. 12(b). In this manner, according to the conventional method, due to the displacement of head arrangement large blank areas are generated and consequently border becomes visible, while by executing the allocation process for each short heads utilizing the present embodiment, large unevenness (low frequency unevenness) can be eliminated and the blank area caused by the displacement of head arrangement is suppressed. As the result, satisfactory head connection can be achieved.

(4) Other Embodiments

Although in the above embodiment, the example of line head 150 configured with two short heads 150A and 150B is used for simple explanation, the embodiment is applicable to other line head configured with three or more short heads. Specifically, in a case where the third short head (head C) is arranged in the main scanning direction with overlapping to head B through an overlapping region bc, in the region bc the similar allocation process as in the REGION ab can be executed.

Further, in the above image recording device 100 the fixing section 160 is provided, however, the present embodiment is applicable to an image recording device having no fixing section or to an image recording device with a fixing section provided externally to the image recording device.

Further, the above image forming device is preferable to an inkjet printer, however, is applicable to a recording device or printing device of other system than the inkjet system.

Further the recording in the above embodiment does not mean only the recording by ink ejection, but applicable to a luminescent display. Namely, the above embodiment is applicable to an image display device that moves a line head configured with a plurality of short heads and conducts luminescent drive.

EXPLANATION OF SYMBOLS 100 image recording device
101 controller
105 memory section
110 rasterizing processor
120 halftone processor
130 allocation processor
140 drive section
140A first driver
140B second driver
150 line head
150A first short head
150B second short head

What is claimed is:

1. An image recording method utilizing a line head including a plurality of recording element arrays, each having a plurality of recording elements in one direction, arranged in said one direction such that the recording elements have overlapping regions at the mutually adjoining end portions of the recording element arrays, the image recording method comprising:
a halftone processing step for executing a halftone process of multilevel image data according to a first halftone processing rule to generate a dot pattern as a recording pattern to be recorded by outputting a recording material from a recording element of the plurality of recording element arrays;
an allocation processing step for applying a second halftone process by each pixels constituting the recording pattern formed by the first halftone process to determine which of the adjoining recording element arrays records the dot; and
a recording step for recording dot data allocated to each of the recording element arrays by using the recording elements of each of the plurality of recording element arrays included in the line head,
wherein the second halftone process has a property to suppress a low frequency component of a two-dimensional spatial frequency domain for each of the dot data having been allocated, and judgment of allocating the dot of each pixel position to which of the recording element arrays is determined based on a result of allocation of the pixel position having been already determined.

2. The image recording method of claim 1, wherein the allocation processing step by the second halftone process is a process to refer an allocation rate to allocate a dot by each nozzle of one of the recording element arrays in the overlapping region, and to apply the second halftone processing rule to sequentially determine whether or not to allocate the dot of the recording pattern onto one of the recording element arrays by each pixels constituting the recording pattern according to the allocation rate,
wherein the allocation processing step comprises:
a correction pixel value calculating step for calculating the correction pixel value by correcting an input pixel value of a subject pixel position for executing the allocation processing, by utilizing the allocation rate and a quantization error calculated at the pixel position to which the dot allocation having been determined;
a first allocation judgment step, in cases where the subject pixel position is a position for generating a dot in the recording pattern, for comparing whether or not the correction pixel value is larger than a prescribed threshold value, executing a first determination according to the result of the comparison whether to allocate a dot of the subject pixel position onto one of the recording element arrays, calculating a result value caused by the first determination for the subject pixel position, and calculating a quantization error between the correction pixel value and the result value as a quantization error corresponding to the subject pixel position; and
a second allocation judgment step, in cases where the subject pixel position is a position for not forming the dot in the recording pattern, for executing a second determination not to allocate the dot onto any of the recording element arrays, calculating a result value caused by the second determination for the subject pixel position, and calculating a quantization error between the correction pixel value and the result value as a quantization error corresponding to the subject pixel position.

3. The image recording method of claim 2, wherein the allocation rate is determined to become smaller as the position of a recording element comes nearer to an end portion from a central portion of the recording element array.

4. The image recording method of of claim 1, wherein the recording material is an ink, and the recording element is a nozzle for ejecting the ink.

5. An image recording device comprising:
a line head including a plurality of recording element arrays, each having a plurality of recording elements in one direction, arranged in said one direction such that the recording elements have overlapping regions at the mutually adjoining end portions of the recording element arrays;
a halftone processor for executing a halftone process of multilevel image data according to a first halftone processing rule to generate a dot pattern as a recording pattern to be recorded by outputting a recording material from a recording element of the plurality of recording element arrays;
an allocation processor for applying a second halftone process by each pixels constituting the recording pattern formed by the first halftone process to determine which of the adjoining recording element arrays records the dot;
a drive section to drive the recording elements of each of the plurality of recording element arrays included in the line head for recording dot data allocated to each of the recording element arrays; and
wherein the second halftone process has a property to suppress a low frequency component of a two-dimensional spatial frequency domain for each of the dot data having been allocated, and judgment of allocating the dot of each pixel position to which of the recording element arrays is determined based on a result of allocation of the pixel position having been already determined.

6. The image recording device of claim 5, wherein the allocation processor utilizing the second halftone process is configured to determine an allocation rate to allocate a dot by each nozzle of one of the recording element arrays in the overlapping region, and to apply the second halftone processing rule to sequentially determine whether or not to allocate the dot of the recording pattern onto one of the recording element arrays by each pixels constituting the recording pattern according to the allocation rate,
wherein the allocation processor comprises:
a correction pixel value calculating section to calculate the correction pixel value by correcting an input pixel value of a subject pixel position for executing the allocation processing, by utilizing the allocation rate and a quantization error calculated at the pixel position to which the dot allocation having been determined;
a first allocation judgment section, in cases where the subject pixel position is a position for generating a dot in the recording pattern, to compare whether or not the correction pixel value is larger than a prescribed threshold value, to execute a first determination according to the result of the comparison whether to allocate a dot of the subject pixel position onto one of the recording element arrays, to calculate a result value caused by the first determination for the subject pixel position, and to calculate a quantization error between the correction pixel value and the result value as a quantization error corresponding to the subject pixel position; and a second allocation judgment section, in cases where the subject pixel position is a position for not forming the dot in the recording pattern, to execute a second determination not to allocate the dot onto any of the recording element arrays, to calculate a result value caused by the second determination for the subject pixel position, and to calculate a quantization error between the correction pixel value and the result value as a quantization error corresponding to the subject pixel position.

7. The image recording device of claim 6, wherein the allocation rate is determined to become smaller as the position of a recording element comes nearer to an end portion from a central portion of the recording element array.

8. The image recording device of claim 5, wherein the recording material is an ink, and the recording element is a nozzle for ejecting the ink.

9. The image recording device of claim 6, wherein the recording material is an ink, and the recording element is a nozzle for ejecting the ink.

10. The image recording method of claim 2, wherein the recording material is an ink, and the recording element is a nozzle for ejecting the ink.

* * * * *